United States Patent [19]

Hardiman

[11] Patent Number: 4,839,325

[45] Date of Patent: Jun. 13, 1989

[54] STABILIZED METAL DRIER

[75] Inventor: Christopher J. Hardiman, Belchertown, Mass.

[73] Assignee: Monsanto Company, St. Louis, Mo.

[21] Appl. No.: 88,915

[22] Filed: Aug. 24, 1987

[51] Int. Cl.[4] .................. C08F 4/80

[52] U.S. Cl. .................. 502/170; 526/135; 526/301

[58] Field of Search .................. 502/169, 170, 172

[56] References Cited

U.S. PATENT DOCUMENTS

| | | | |
|---|---|---|---|
| 4,038,114 | 7/1977 | Oberth | 502/170 |
| 4,175,064 | 11/1979 | Landau et al. | 502/170 |
| 4,180,386 | 12/1979 | McCormack et al. . | |
| 4,590,101 | 5/0019 | Knapczyk | 427556/350 |

OTHER PUBLICATIONS

"Ionization Constants of Polyfluorinated b-Diketones" by Pashkevich et al., from Zuhrnal Obshchei Khimii, vol. 49, No. 1, pp. 212-215, Jan. 1979.

"Polyfluorinated b-Diketones with a Terminal Hydrogen Atom in the Fluoroalkyl Radical" by Pashkevich et al. from Zhurnal Organicheskoi Khimii, vol. 13, No. 1, pp. 49-52, Jan. 1977.

"Fluorine-containing b-Diketones" by Pashkevich et al., from Russian Chemical Reviews, 50 (2) 1981.

*Primary Examiner*—Edward J. Smith

*Attorney, Agent, or Firm*—R. Bruce Blance; WIlliam J. Farrington; Thomas E. Kelley

[57] ABSTRACT

Fluorinated pentanedione-stabilized metal driers provide coating compositions of extended pot life. Allyloxy activated surface coatings of free radical-polymerizable compounds having fluorinated pentanedione stabilized metal drier and peroxide free radical initiator provide durable films.

3 Claims, No Drawings

STABILIZED METAL DRIER

This invention relates to allyloxy activated surface coatings of free-radical compounds, especially to such coatings cured with metal drier catalysts that are moderated by fluorinated pentanedione compounds.

Surface coatings of free radical-polymerizable compounds are preferably cured with an activator or crosslinker to provide a durable coating. Such curing is often promoted by use of a metal drier, e.g. a cobalt or manganese compound, and a free radical initiator, e.g. a peroxide. Such metal driers enhance the curing by allowing rapid (e.g. less than about 1 hour) curing to tough, tack free films at low temperatures (e.g. less than 100 C.). A disadvantage is that coating compositions comprising desirable metal driers such as cobalt compounds and peroxides have undesirably short pot life, e.g. often less than about an hour or so. As disclosed in copending application Ser. Nos. 946,740 and 946,742, both filed Dec. 24, 1986, extended pot life, e.g. at least about 8 hours or more, has been provided with coating compositions comprising a temporary catalyst inhibitor, e.g. a strong fugitive acid such as trifluoroacetic acid.

An object of this invention is to provide a moderated metal drier catalyst which exhibits the desirable characteristics of cobalt compounds such as rapid cure at low temperature, but which has a substantially extended pot life and low acidity.

SUMMARY OF THE INVENTION

Disclosed herein are inventions providing stabilized metal drier (e.g. a cobalt or manganese compound) comprising a fluorinated pentanedione compound. Also disclosed are inventions of coating compositions comprising unsaturated compounds and such stabilized metal driers. Other inventions relate to cured films and processes for providing cured films on a substrate by applying such coating compositions.

In preferred embodiments such compositions can comprise polyallyloxy compounds and/or free radical initiators.

DETAILED DESCRIPTION OF THE INVENTION

The stabilized metal drier of this invention comprises a metal compound that is effective in catalyzing free-radical polymerization of unsaturated compounds where the catalytic effect of the metal compound is reversibly inhibited by a fluorinated pentanedione compound, such as 1,1,1-trifluoro-2,4-pentanedione (TFPD) or 1,1,1,5,5,5-hexafluoro-2,4-pentanedione (HFPD). While TFPD and HFPD ae commercially available, they along with other fluorinated pentanedione compounds can be prepared by methods described by Pashkevich et al. in Zh. Org. Khim., 13 (1), pp. 49–52 (1977), incorporated herein by reference.

In many cases, preferred fluorinated pentanediones are acidic, that is they have a pKa less than 7. In those cases where it is preferred that coating compositions have low acidity, it is useful to select fluorinated pentanediones with pKa between about 4 and 7, preferably close to 7. The pKa of TFPD is reported to be about 6.5. The pKa's of other fluorinated pentadiones are reported by Pashkevich et al. in Zh. Org. Khim., 49 (1) pp. 212–215 (1979), incorporated herein by reference.

The metal compound can include any of the metal driers which are well known in the coating industry. Preferred metal compounds include cobalt or manganese compounds, e.g. fatty acid salts of such metals. In preferred embodiments the cobalt compound can comprise any of a variety of compounds such as cobaltous acetate, citrate, acetyl-acetonate, 2-ethyl hexanoate and the like. Metal compounds are often provided in coating compositions at catalytic levels of from about 0.001 to about 1.0% by weight.

In characterizing the fluorinated pentanedione compounds useful in the metal driers, coating compositions and processes of this invention, the term "fugitive" describes the transience of such compounds under coating conditions. For instance, fluorinated pentanedione compounds have been found to be advantageously stable components of such metal driers, or coating compositions, providing inhibition of the catalytic action of the metal drier. However, when films of such coating compositions are subjected to curing conditions, e.g. elevated temperatures (e.g. 50° to 200° C.) or reduced vapor pressure, the inhibiting effect of fluorinated pentanedione compound is advantageously diminished. The controllable transience of such stabilizing effect is believed to be due to evaporation of fluorinated pentanediones at curing conditions, e.g. preferred fluorinated pentanedione compounds have low boiling points. In this regard TFPD has a boiling point of about 105° C. and HFPD has a boiling point of about 70° C.

The catalysts and compositions of this invention will comprise an amount of fluorinated pentanedione compound which is sufficient to materially retard the catalytic effect of the metal compound at least at storage conditions of coating compositions at least one equimolar amount of fluorinated pentanedione compound as compared to metal drier. In general higher levels of (e.g. up to about 10, or even 20 times the amount of metal on a molar basis) can be tolerated and may be desired to assure sufficient catalytic retardation; in preferred cases, it is useful to provide between 2 and 15 times the molar amount of metal drier.

The stabilized metal drier of this invention can be provided as a solution or suspension of metal compound and the fluorinated pentanedione compound in commonly used solvents including water, ketones such as methyl isobutyl ketone, methyl ethyl ketone, acetone and the like and mixtures thereof. In some cases it may also be advantageous to provide a free radical initiator with the metal drier. Such free radical initiator can comprise peroxides such as t-butyl hydroperoxide, cumene peroxide, methyl ethyl ketone peroxide, lauroyl peroxide benzoyl peroxide, azo-bis(isobutyronitrile) and the like and mixtures thereof.

The effective stabilization of the metal drier of this invention by the fluorinated pentanedione compound is generally advantageously promoted by the presence of at least a minor amount of water of promote hydration of the acidic proton. Since water is often present in minor but sufficient amounts in components used in the driers and coating compositions of this invention the deliberate addition of specific quantities of water is often not required.

Also provided herein is an invention of coating compositions comprising the stabilized metal drier of this invention and free radical-polymerizable compound which can be aerobically or anaerobically curable.

The free radical-polymerizable compound useful in the composition of this invention can be an unsaturated monomer or oligomer or mixture of monomers and oligomers. The nature of the compound is not critical so long as it is activated towards free radical polymerization via the double bonds when it is brought into reactive admixture with a metal drier and/or free radical initiator. Such compounds include drying oils such as castor, linseed, oticica, safflower, soybean sunflower, tung and certain fish oils; acrylic monomers; vinyl monomers such as styrenic monomers, vinyl ethers, vinyl esters, vinyl imides, vinyl amides; maleates and fumarates. In many cases it is preferred that such compounds be selected from acrylyl monomers or oligomers; such preferred compounds desirably having a number average molecular weight less than about 4000 and contain from 1 to about 10 unsaturated groups per molecule. A particularly preferred group of acrylyl monomers is represented by the structure:

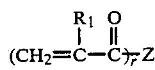

where $R_1$ is selected from the group consisting of H, $CH_3$ and $C_2H_5$, where r is an integer in the range of 1 to 10 and Z is a saturated or ethylenically unsaturated residue of an alcohol or polyol, a carboxylic acid or poly carboxylic acid, an amine or a polyamine, an epoxide or polyepoxide or an isocyanate or polyisocyanate of a number average molecular weight less than about 4000 containing a hydrocarbon, ester, amide, ether or urethane backbone. Such monomers may be obtained by reaction of acryloyl, methacryloyl or ethacryloyl chloride with an alcohol, a polyol, an amine, or a polyamine or by the reaction of acrylic acid, methacrylic acid or ethacrylic acid with an epoxide, a polyepoxide, an isocyanate, or a polyisocyanate, or by reaction of a hydroxyalkyl acrylate, methacrylate or ethacrylate with a carboxylic acid, polycarboxylic acid, an epoxide, a polyepoxide, an isocyanate, or a polyisocyanate. Such monomers include methyl acrylate, methyl methacrylate, butyl acrylate 1,3-butylene glycol diacrylate, 1,6-hexanediol diacrylate, the polyacrylates, polymethacrylates and polyethacrylates of polyethylene glycols and polyols, polypropylene glycols and polyols and poly(tetramethylene glycols) and poly(tetramethylene) polyols of molecular weight in the range of 100 to 400, pentaerythritol tetracrylate, trimethylolpropane triacrylate, dipentaerythritol monohydroxypentacrylate, ethoxylated bisphenol A dimethacrylate, the diacrylates, dimethacrylates and diethacrylates of epoxy compounds formed from bisphenol A and epichlorohydrin of molecular weight in the range of 200 to 4000, and the polyacryloyl monomers prepared by reacting isocyanate capped polyethers and isocyanate capped polyesters of molecular weight up to 4000 with hydroxyethyl acrylate.

The coating compositions of this invention can also comprise crosslinking agent.

In many cases the coating compositions will also comprise an allyloxy compound which may tend to activate the cure process. Certain allyloxy compounds can advantageously serve as crosslinking agents to provide desirable cured film properties. Suitable allyloxy compounds are selected from $\beta,\gamma$-unsaturated ethers having at least one $\alpha$-hydrogen atom in which the allyloxy group may be represented by the following formula:

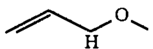

The $\beta,\gamma$-unsaturated ether compound has an equivalency less than about 300, based upon the number of $\beta,\gamma$-unsaturated ether groups having an $\alpha$-hydrogen, a molecular weight less than about 10,000, and has from 1 to 60 $\beta,\gamma$-unsaturated ether groups.

The allyloxy compounds are generally aliphatic in character. Alternatively, compounds having $\beta,\gamma$-unsaturation with a triple bond as in propargyl methyl ether, dipropargyl ether, tripropargyl trimethylol propane, or hexapropargyl sorbitol may be used and are considered equivalent to allyloxy compounds for purposes of this invention. Exemplary of allyloxy compounds useful in the compositions of this invention are the following: methyl allyl ether, methyl methallyl ether, butyl allyl ether, diallyl ether, allyl methallyl ether, dicrotyl ether di-(2-chloro-2-propenyl) ether, di-(2-phenyl-2-propenyl) ether, di(1-methyl-2-propenyl) ether, 1-phenyl-2-propenyl ether, di-(3-phenyl-2-propenyl) ether, di-(2-isopropyl-2-propenyl) ether, 1,4-diallyl oxy-2-butene, 1,4-diallyloxy-2-butyne, 1,6-diallyl oxyhexane, 1,4-dimethallyloxypentane, 2,5-dimethoxy-2,5-dihydrofuran, allyl glycidyl ether; allyloxy compounds prepared from the ionic polymerization of allyloxyalkyl acrylates, methacrylates, acrylamides or the allyloxy derivatives of vinyl ethers, such as poly(allyloxyethylmethacrylate) and poly(allyl vinyl ether); allyloxy compounds wherein the allyloxy group forms part of an oligomeric backbone, such as poly-(2-buten-1,4-diol) or 2,5-poly(2,5-dihydrofuran).

Preferred allyloxy compounds may be selected from the group of polyethers and polyesters represented by the structural formula:

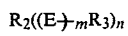

where $R_2$ is a radical of molecular weight less than about 10,000 obtained by removal of active hydrogen from an active hydrogen compound selected from the group consisting of water, alcohols, thiols, carboxylic acids, carboxylic amides and amines, where the functionality of $R_2$ is n and is in the range of 1 to 10, where E is a divalent radical selected from the group represented by the formulae

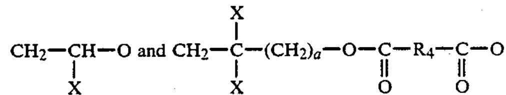

where the X groups are independently selected from the group consisting of H, $CH_3$, $C_2H_5$ and $CH_2OCH_2Y$, Y being selected from the group consisting of $CH{=}CH_2$, $H_3C{-}C{=}CH_2$, and $H_5C_2{-}C{=}CH_2$, where a is 0 or 1, where $R_3$ is hydrogen or an unsubstituted or substituted $C_1$ to $C_{10}$ hydrocarbyl radical, where $R_4$ is a divalent unsubstituted or substituted $C_2$ to $C_{10}$ hydrocarbyl radical and where the product of m and n is at least 4 and not more than about 60. It is anticipated that any of the hydrogens in Y, except at least one alpha to the ether group, can be replaced with a lower alkyl without substantially affecting the invention and that the resulting compounds would be equivalent to those according to the invention. Polyethers containing an allyloxy group may be prepared by ionic polymerization of allyl glycidyl ether or mixtures of allyl glycidyl ether and the appropriate alkylene oxide and polyesters containing an allyloxy group may be prepared by polymerization of a suitable dicarboxylic acid and the monoallyl ether of glycerol. Suitable polyesters may also be prepared by substituting for the monoallyl ether of glycerol, the monoallyl ether of trimethylolethane, the monoallylether of trimethylolpropane, the monoallyl ether of pentaerythritol, the diallyl ether of pentaerythritol and similar mono and polyallyl ethers of polyols. Allyl glycidyl ether or methallyl glycidyl ether may also be substituted for the monoallyl ether of glycerol.

Another group of preferred allyloxy compounds is represented by the structural formula:

$R_5(OCH_2Y)_p$ where $R_5$ is a $C_2$ to $C_{12}$ aliphatic hydrocarbyl or oxahydrocarbyl radical of equivalence p in the range of 2 to 12 and Y is a group as defined hereinabove. Such compounds include tetrallyl pentaerythritol, hexaallyl dipentaerythritol, hexallyl sorbitol, hexamethallyl mannitol, tetraallyl-$\beta$-methyl glucoside, and decaallyl sucrose.

Yet another group of preferred allyloxy compounds are acetals derived from allyl alcohol or methallyl alcohol and aldehydes and those derived from a polyol and an acrolein compound represented by the structural formulas:

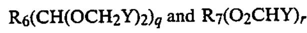

$R_6(CH(OCH_2Y)_2)_q$ and $R_7(O_2CHY)_r$ where $R_6$ is absent or is a $C_1$ to $C_{20}$ unsubstituted or a substituted hydrocarbyl group, Y is a group as defined hereinabove and q is in the range of 2 to about 30; and where $R_7$ is a radical of molecular weight less than about 10,000 obtained by removal of at least two active hydrogens from a polyol and r is in the range of about 1 to about 170. Such compounds include 1,1,2,2-tetrakis(allyloxy)ethane, 1,1,6,6-tetrakis(allyloxy)hexane and those derived from acrolein, methacrolein or crotonaldehyde and a polyol and those derived from polyacrolein and acrolein copolymers. Exemplary are triallylidine sorbitol and the polyacrolein acetal of polyvinyl alcohol.

The more preferred allyloxy activator compounds are the polyether and polyacetal compounds in which the number of allyloxy groups per average molecule is in the range of 2 to 40 and the allyloxy equivalent is less than about 250. Most preferably the allyloxy equivalent is less than about 150.

Depending on the end use and the application requirements it may be convenient to add any of the other conventional additives for surface coating compositions such as solvents, pigments, fillers, reinforcing agents, stabilizers, inhibitor and flow control agents.

The proportions of the ingredients can vary widely depending on the compatibility of the major ingredients and the nature of the coating to be obtained. The major ingredients are advantageously selected to be compatible with one another to provide a sufficiently rapid cure of the coating and to avoid impairment of gloss and clarity of the cured coatings. Compatibility is readily determined by mixing the major ingredients and determining the range of mixtures which do not form cloudy solutions or coatings or separate into phases. Provided that the major ingredients are suitably compatible, a weight range of allyloxy compound to free-radical-polymerizable compound (e.g. in the range of from 70:30 to 1:99) can be used. Preferably this ratio will be in the range from 40:60 to 5:95 to provide an adequate rate of cure and an adequate level of mechanical properties in the cured coating.

In those cases where it may be desirable to provide solvent (or vehicle) for the coating composition of this invention, such solvent is preferably a volatile organic compound comprising a ketone, such as acetone, methyl ethyl ketone, methyl isobutyl ketone, etc.; an ester such as ethylene glycol monoethyl ether acetate; an aromatic such as toluene, xylene; or a mixture thereof.

The following disclosure is provided to illustrate specific embodiments and aspects of this invention but does not imply any limitation of the scope of the invention.

In the following described materials, the symbol "(n)" indicates a solution in the identified solvent where "n" is the weight percent of the described material in solution.

MATERIALS USED

UVI(n): acrylated urethane oligomer obtained from Morton-Thiokol Company as Uvithane-893, unsaturation 0.15–0.175 equivalents/100 g; diluted with MEK to provide a solution of weight percent indicated in parenthesis, e.g. UVI(75) is 75 wt.% of acrylated urethane oligomer.

AOC: allyloxy compound, a reaction product of ethylene glycol and allyl glycidyl ether (1:10 mole ratio) in the presence of boron trifluoride/etherate catalyst at 75°–80° C. The allyl glycidyl ether is added over a period of 5 hours. The catalyst is neutralized with NaOH solution. The aqueous phase is separated from an organic phase product which is dried and filtered. The liquid organic product has a Gardner viscosity of F at 25° C. and an allyloxy equivalent of about 120.

MEK: methyl ethyl ketone.

BPO(n): benzoyl peroxide in MEK solution.

Co(n): a cobalt catalyst compound obtained from Nuodex, Inc. as Nuocure TM 10% cobalt catalyst in mineral spirits; solution diluted with MEK to weight percent cobalt indicated in parenthesis, e.g. Co(0.1) is 0.1 wt.% cobalt.

HFPD(n): 1,1,1,5,5,5-hexafluoro-2,4-pentanedione in MEK solution.

TFPD(n): 1,1,1-trifluoro-2,4-pentanedione in MEK solution.

TFA(n): trifluoroacetic acid in MEK solution.

BYK: a mar and slip additive obtained from Mallinkrodt, Inc. as BYK-341.

ETOH(n): ethanol in water solution.

$H_2O$: water.

EXAMPLE 1

This example serves to illustrate the use of TFPD and HFPD for stabilizing a metal drier, the extended pot life of coating compositions using such stabilized metal drier and the curing of such coating composition to a hard tack free (i.e. not sticky to touch) film under routine curing conditions.

Coating compositions A and B were prepared from components in the amounts indicated in Table 1.

Pot life, the time for the composition to thicken to a viscosity unsuitable for coating applications, was qualitatively determined by examining the composition stored in a capped, half-full clear glass jar under a head of nitrogen at room temperature.

Composition A (5 moles TFPD/mole cobalt) had a pot life of about 45 days; composition B (2 moles HFPD/mole cobalt) had a pot life of about 15 days. Moreover, films (about 10 microns thick) of both compositions were tack free (to the touch) after curing at about 82° C. for 30 minutes, indicating the fugitive nature of the pentanedione compounds.

TABLE 1

| COATING COMPOSITIONS | | |
|---|---|---|
| | (parts by weight) | |
| Component: | A | B |
| UVI (75) | 5.3 | 5.3 |
| AOC 1 | 1 | 1 |
| Co (.1) | 0.5 | 0.5 |
| BYK | .06 | .06 |
| TFPD (10) | .07 | — |
| HFPD (3) | — | .07 |
| Pot life (days) | 45 | 15 |

EXAMPLE 2

This example serves to illustrate the effect of water in significantly increasing the pot life of compositions comprising HFPD (12.4 moles HFPD/mole cobalt). Compositions C and D were prepared from the components in the amounts set forth in Table 2. Films (about 10 microns thick) of each composition remained tacky after exposure to curing conditions, i.e. 30 minute exposure to 82° C. air; films cured to a slightly tacky state on standing overnight (about 16 hours) in room temperature air. The pot life was substantially increased by about a factor of 10 by the addition of a small amount of water.

TABLE 2

| COATING COMPOSITIONS | | |
|---|---|---|
| | (parts by weight) | |
| Component: | C | D |
| UVI (68.5) | 5.5 | 5.5 |
| AOC | 1 | 1 |
| Co (.1) | 0.5 | 0.5 |
| EtOH | 0.3 | 0.2 |
| $H_2O$ | 0 | 0.1 |
| HFPD (10) | 0.218 | 0.218 |

TABLE 2-continued

| COATING COMPOSITIONS | | |
|---|---|---|
| | (parts by weight) | |
| Component: | C | D |
| Pot life (days) | 4 | 47 |

EXAMPLE 3

This example serves to illustrate the substantially-increased pot life afforded to coating compositions containing metal drier by the use of TFPD.

Compositions E, F, G, H and I were prepared from the components in the amounts indicated in Table 3, with TFA or TFPD provided at a ratio of about 12.4 moles per mole of cobalt. When subjected to curing conditions (i.e. 30 minutes in 82° C. air) films (about 10 microns thick) of each composition became tack-free except for compositions F and G which were slightly tacky.

The extended pot life afforded by TFPD as compared to equimolar amounts of TFA is especially advantageous when stabilizer of low acidity is desired.

TABLE 3

| COATING COMPOSITIONS | | | | | |
|---|---|---|---|---|---|
| | (parts by weight) | | | | |
| | E | F | G | H | I |
| UVI (68.5) | 5.5 | 5.5 | 5.5 | 5.5 | 5.5 |
| AOC | 1 | 1 | 1 | 1 | 1 |
| Co (1) | 0.5 | 0.5 | 0.5 | 0.5 | 0.5 |
| EtOH | 0.5 | .4 | .3 | 0.3 | 0.2 |
| $H_2O$ | 0 | 0 | .1 | 0 | 0.1 |
| TFA (10) | 0 | .12 | .12 | 0 | 0 |
| TFPD (10) | 0 | 0 | 0 | .162 | .162 |
| Pot Life (days) | ½ | 30 | 51 | >89 | >89 |

While specific embodiments of the invention have been described, it should be apparent to those skilled in the art that various modifications thereof can be made without departing from the true spirit and scope of the invention. Accordingly, it is intended that the following claims cover all such modifications within the full inventive concept.

What is claimed is:

1. A metal drier composition consisting of a free radical polymerization-catalyzing fatty acid metal salt and a fluorinated 2,4 pentanedione.

2. A metal drier composition according to claim 1 wherein said metal salt is a salt of cobalt or manganese.

3. A metal drier according to claim 1 wherein said stabilizer is 1,1,1-trifluoro-2,4-pentanedione.

* * * * *

UNITED STATES PATENT AND TRADEMARK OFFICE
CERTIFICATE OF CORRECTION

PATENT NO. : 4,839,325

DATED : June 13, 1989

INVENTOR(S) : Hardiman

It is certified that error appears in the above-identified patent and that said Letters Patent is hereby corrected as shown below:

In col. 3, line 46, the number"400" should read, instead, ---4000---.

In col. 2, line 55, the word "of" should read, instead, ---to---.

Signed and Sealed this

Eighth Day of May, 1990

*Attest:*

HARRY F. MANBECK, JR.

*Attesting Officer*

*Commissioner of Patents and Trademarks*